United States Patent
Naruko et al.

(10) Patent No.: US 10,279,561 B2
(45) Date of Patent: May 7, 2019

(54) LAMINATED BODY AND PROCESS FOR PRODUCING THE SAME

(71) Applicant: Toray Industries, Inc., Tokyo (JP)

(72) Inventors: Satoshi Naruko, Otsu (JP); Takashi Kimura, Otsu (JP); Tatsushi Kamiya, Chiryu (JP); Takahiro Masegi, Chiryu (JP); Shinichi Kondo, Chiryu (JP)

(73) Assignee: Toray Industries, Inc. (JP)

( * ) Notice: Subject to any disclaimer, the term of this patent is extended or adjusted under 35 U.S.C. 154(b) by 10 days.

(21) Appl. No.: 14/777,934

(22) PCT Filed: Mar. 25, 2014

(86) PCT No.: PCT/JP2014/058287
§ 371 (c)(1),
(2) Date: Sep. 17, 2015

(87) PCT Pub. No.: WO2014/157205
PCT Pub. Date: Oct. 2, 2014

(65) Prior Publication Data
US 2016/0297172 A1    Oct. 13, 2016

(30) Foreign Application Priority Data
Mar. 26, 2013 (JP) .................. 2013-063481

(51) Int. Cl.
*B32B 7/04* (2019.01)
*B32B 5/02* (2006.01)
(Continued)

(52) U.S. Cl.
CPC ............... *B32B 5/022* (2013.01); *B32B 5/08* (2013.01); *B32B 7/04* (2013.01); *B32B 27/06* (2013.01);
(Continued)

(58) Field of Classification Search
CPC ..... D01F 6/765; D21H 13/20; B32B 2250/02; B32B 2262/00; B32B 2262/02;
(Continued)

(56) References Cited

U.S. PATENT DOCUMENTS 4,286,018 A    8/1981   Asakura et al.
4,726,987 A *  2/1988   Trask .................. B32B 5/06
                                                    156/276

(Continued)

FOREIGN PATENT DOCUMENTS

JP    55-35459 A    3/1980
JP    63-237949     10/1988
(Continued)

OTHER PUBLICATIONS https://www.merriam-webster.com/dictionary/film, Mar. 2018.*
(Continued)

*Primary Examiner* — Lawrence D Ferguson
(74) *Attorney, Agent, or Firm* — DLA Piper LLP (US)

(57) ABSTRACT

A laminated body that exhibits heat resistance, chemical resistance, good interfacial adhesion, good varnish-impregnation and also has a three-dimensional formability and results in low variability in the shapes of the products in a forming process and an excellent forming process yield. The laminated body includes a thermoplastic resin sheet layer having a heat of crystallization of 10 J/g or more and a wet-laid nonwoven layer including polyphenylene sulfide fibers and having a heat of crystallization of 10 J/g or more, the wet-laid nonwoven layer being stacked on at least one surface of the thermoplastic resin sheet layer without an adhesive therebetween.

6 Claims, 2 Drawing Sheets

(51) Int. Cl.
| | |
|---|---|
| B32B 27/12 | (2006.01) |
| B32B 27/06 | (2006.01) |
| B32B 37/10 | (2006.01) |
| B32B 37/14 | (2006.01) |
| B32B 5/08 | (2006.01) |
| B32B 27/28 | (2006.01) |
| B32B 27/36 | (2006.01) |
| D21H 13/20 | (2006.01) |
| D01F 6/76 | (2006.01) |

(52) U.S. Cl.
CPC ............ *B32B 27/12* (2013.01); *B32B 27/286* (2013.01); *B32B 27/36* (2013.01); *B32B 37/10* (2013.01); *B32B 37/14* (2013.01); *D01F 6/765* (2013.01); *D21H 13/20* (2013.01); *B32B 2250/02* (2013.01); *B32B 2262/00* (2013.01); *B32B 2262/02* (2013.01); *B32B 2262/0215* (2013.01); *B32B 2274/00* (2013.01); *B32B 2307/206* (2013.01); *B32B 2307/306* (2013.01); *B32B 2307/704* (2013.01); *B32B 2307/738* (2013.01); *B32B 2457/04* (2013.01)

(58) Field of Classification Search
CPC ........ B32B 2262/0215; B32B 2274/00; B32B 2307/206; B32B 2307/306; B32B 2307/704; B32B 2307/738; B32B 2457/04; B32B 27/06; B32B 27/12; B32B 27/286; B32B 27/36; B32B 37/10
See application file for complete search history.

(56) References Cited

U.S. PATENT DOCUMENTS 4,780,359 A * 10/1988 Trask .................. D04H 1/4374
 156/276
5,026,456 A 6/1991 Hesler et al.
2011/0114274 A1 5/2011 Takano et al.

FOREIGN PATENT DOCUMENTS

| JP | 63-237949 A | 10/1988 |
|---|---|---|
| JP | 4-228696 A | 8/1992 |
| JP | 08-197690 A | 8/1996 |
| JP | 2000-37805 A | 2/2000 |
| JP | 2011-173418 A | 9/2011 |
| JP | 2012-245728 A | 12/2012 |

OTHER PUBLICATIONS

Supplementary European Search Report dated Nov. 3, 2016, of corresponding European Application No. 14776276.9.
Spruiell, J.E., et al., "ORNL/TM-2004/304 A Review of the Measurement and Development of Crystallinity and Its Relation to Properties in Neat Poly(Phenylene Sulfide) and Its Fiber Reinforced Composites," Oct. 31, 2004, XP055313408, URL: http://web.ornl.gov/~webworks/cppr/y2001/rpt/122159.pdf.

* cited by examiner

LAMINATED BODY AND PROCESS FOR PRODUCING THE SAME

TECHNICAL FIELD

This disclosure relates to a laminated body that has a very excellent thermoform-ability and can be used as an electric insulation sheet for electric devices such as motors, alternators and transformers.

BACKGROUND

Along with the development of miniaturized, light-weight and high performance electric devices, insulation systems have recently been required to be miniaturized and have high performance. One effective approach to meeting such requirements is to design a new shaped insulation system. However, conventional insulation sheets can be formed into only a limited variety of shapes due to their poor physical properties and poor formability.

Known conventional electric insulation sheets that can be used as an electric insulation sheet required to have Class F or higher heat resistance are, for example, a film made of a polyphenylene sulfide (hereinafter also referred to as PPS), a polyimide, and/or the like (see JP 55-35459 A), a laminated body composed of a wet-laid polyphenylene sulfide fiber nonwoven fabric and a synthetic resin film (see JP 63-237949 A), a laminated body composed of an unstretched polyphenylene sulfide sheet and a fiber sheet (see JP 8-197690 A), a laminated body composed of a fiber sheet and a silicone rubber (see JP 4-228696 A), and a paper composed of poly-m-phenyleneisophthalamide fibrids and poly-m-phenyleneisophthalamide fibers (see JP 2012-245728 A).

However, none of those conventional materials satisfies current requirements. For example, when the film of JP '459 is used alone, the surface is subject to scratching and, from the scratched part, cracking and tearing may occur. The film is poorly impregnated with a resin, and is difficult to fix to the peripheral components. The laminated body of JP '949 composed of the film and the fiber sheet is designed to prevent scratching on the film. The fiber sheet serves as a protective layer for the film, thereby solving the problems of cracking, tearing and poor resin impregnation. However, the design is not intended to exhibit adequate formability, and the laminated body thus has poor elongation, as a result of which the laminated body may tear during the formation process. JP '690 proposes a laminated body using an unstretched polyphenylene sulfide sheet to improve shock resistance and formability. In general, an unstretched polyphenylene sulfide sheet exhibits excellent formability when used alone. However, for a laminated body to exhibit excellent formability, all the materials that constitute the laminated body have to exhibit excellent formability. In JP '690, there is no limitation on the fiber sheet.

JP '696 proposes a laminated body composed of a fiber sheet and a silicone rubber. Since a silicone rubber is elastic, the laminated body has the advantage of less occurrence of overlapped wrinkles at the time of deep drawing. However, there still remains the problem of incapability of being formed into a shape that requires extensive elongation. JP '728 proposes a paper composed of poly-m-phenyleneisophthalamide fibrids and poly-m-phenyleneisophthalamide fibers. The paper cannot be softened or melted even under a high temperature of 200° C. or higher. Thus, the materials cannot be elongated during the forming process, and when the paper is excessively elongated, the paper will break.

As described above, a laminated body that has a good three-dimensional formability and results in low variability in the shapes of the products in a forming process and an excellent forming process yield has not been invented yet.

It could therefore be helpful to provide a laminated body that has a good three-dimensional formability and results in low variability in the shapes of the products in a forming process and an excellent forming process yield.

SUMMARY

We thus provide a laminated body comprising a thermoplastic resin sheet layer having a heat of crystallization of 10 J/g or more as measured with a differential scanning calorimeter and a wet-laid nonwoven layer comprising polyphenylene sulfide fibers and having a heat of crystallization of 10 J/g or more as measured with a differential scanning calorimeter, the wet-laid nonwoven layer being stacked on at least one surface of the thermoplastic resin sheet layer without an adhesive therebetween.

The laminated body is produced by a process comprising forming a wet fiber web from polyphenylene sulfide fibers comprising 80 to 100% by mass of unstretched polyphenylene sulfide fibers and 20 to 0% by mass of stretched polyphenylene sulfide fibers by a wet-laid papermaking process, drying the wet fiber web to give a wet-laid nonwoven layer that has not been subjected to thermocompression bonding, stacking the wet-laid nonwoven layer on at least one surface of an unstretched thermoplastic resin sheet layer without an adhesive therebetween, and bonding the layers by thermocompression bonding.

We provide a laminated body that has a good three-dimensional formability and results in low variability in the shapes of the products in a forming process and an excellent forming process yield.

BRIEF DESCRIPTION OF THE DRAWINGS

FIGS. 2A and 2B represent schematic views before and after press forming with a cylindrical press forming machine used to evaluate deep drawability in Examples.

REFERENCE SIGNS LIST

1 Punch
2 Blank Holder
3 Laminated Body
4 Die Cavity
5 Formed Product
10 Cylindrical Deep Drawing Die

DETAILED DESCRIPTION

Examples will be described below. Needless to say, this disclosure is not limited to the following examples.

Our laminated body comprises a thermoplastic resin sheet layer having a heat of crystallization of 10 J/g or more as measured with a differential scanning calorimeter (DSC) and a wet-laid polyphenylene sulfide fiber nonwoven layer having a heat of crystallization of 10 J/g or more as measured with a DSC, the wet-laid nonwoven layer being stacked on at least one surface of the thermoplastic resin sheet layer without an adhesive therebetween.

We investigated the reasons conventional laminated bodies have a poor three-dimensional formability and result in high variability in the shapes of the products in a forming process and a poor forming process yield. We found that these poor properties are due to high crystallization in either the fiber sheet layer or the resin sheet layer that constitutes the laminated body, or in both, and due to the inhomogeneous structure of the fiber sheet. We then found that the poor properties can be improved by the following approaches: providing a laminated body comprising a fiber sheet layer and a resin sheet layer both being in a low crystalline state and both having a particular heat of crystallization; and producing the fiber sheet layer by a papermaking process, thereby imparting a homogeneous structure to the fiber sheet layer.

If either the wet-laid polyphenylene sulfide fiber nonwoven layer or the thermoplastic resin sheet layer fails to satisfy the specified structure or the specified range of heat of crystallization, the overall sheet elongation of the laminated body may decrease and may be subject to breaking during the forming process. It is therefore important that both of the wet-laid polyphenylene sulfide fiber nonwoven layer and the thermoplastic resin sheet layer that constitute the laminated body satisfy the specified structure and the specified range of heat of crystallization. The wet-laid polyphenylene sulfide fiber nonwoven layer produced by a wet-laid papermaking process has a homogeneous structure, and the homogeneous structure contributes to uniform transmission of forming stress to the fibers constituting the nonwoven, as a result of which stable forming results can be obtained.

The thermoplastic resin sheet layer herein having a heat of crystallization of 10 J/g or more as measured with a differential scanning calorimeter (DSC) is a sheet or film melt formed from a thermoplastic resin and, since the heat of crystallization is 10 J/g or more, the sheet or film is in a low crystalline state. That is, a preferred sheet is a partially stretched sheet or an unstretched sheet. The thermoplastic resin sheet layer having a thickness of 2 to 500 μm is suitable as an insulating material.

The heat of crystallization herein as measured using a differential scanning calorimeter (DSC) can be determined as follows: using a differential scanning calorimeter, a sample is precisely weighed and heated under nitrogen at a heating rate of 10° C./min, and the calorific value of the observed main exothermic peak is determined. A higher value of heat of crystallization indicates a larger proportion of existing amorphous components. A resin sheet with a heat of crystallization of less than 10 J/g exhibits poor elongation during the forming process. As a result, under a temperature of from 90° C. to 170° C., it is impossible to perform deep drawing at a draw ratio of depth to diameter of 0.5 or more, or the yield (the ratio of the number of inspected and passed products to the total number of formed products) of deep drawing at a draw ratio of depth to diameter of 0.5 results in less than 90%.

The thermoplastic resin is, for example, a polyethylene terephthalate (hereinafter also referred to as PET) resin, a polyethylene naphthalate resin, a PPS resin, or the like. Among these, a PPS resin has various excellent properties such as heat resistance, chemical resistance, and hydrolysis resistance, and is durable in severe use environment. For these reasons, PPS resins are particularly suitable as an insulating material.

The PPS herein is a polymer containing, as a repeating unit, phenylene sulfide units such as p-phenylene sulfide units and m-phenylene sulfide units. The PPS resin may be a homopolymer of either of these units or a copolymer of both units. The PPS resin may be a copolymer with another aromatic sulfide. Preferred is a PPS resin in which 70 mol % or more of the repeating units is p-phenylene sulfide. A PPS resin polymer containing a small amount of the component (p-phenylene sulfide units) will have a low crystallinity, a low thermal transition temperature or the like, thus reducing the advantageous characteristics of PPS fibers or a PPS film such as heat resistance, dimensional stability and mechanical properties.

A particular preferred unstretched PPS film (unstretched thermoplastic resin sheet) will be described below.

A preferred unstretched PPS film generally refers to a film, sheet, or board of 2 to 500 μm thickness melt formed from a PPS resin composition, and the film, sheet or board is not stretched and is thus in a low crystalline state. Under a high temperature, such an unstretched PPS film is easily deformable by application of a load, and exhibits very high elongation, and thus extensive deep drawing is possible.

The PPS resin composition herein refers to a resin composition containing 70% by mass or more, preferably 80% by mass or more, of the above-described PPS. A PPS resin composition containing less than 70% by mass of the PPS will have a low crystallinity, a low thermal transition temperature or the like, thus reducing the advantageous characteristics of a PPS resin composition film such as heat resistance, dimensional stability, mechanical properties, and processability.

The remaining proportion, i.e., less than 30% by mass, in the PPS resin composition may be composed of a polymer other than PPS, and/or additives such as an inorganic or organic filler, a lubricant, and a colorant. The PPS resin composition preferably has a melt viscosity of 50 to 1200 Pa·s at a temperature of 320° C. and at a shear rate of 200 $sec^{-1}$ to achieve excellent formability of the sheet.

The process of producing the unstretched PPS film will be described below. The PPS resin composition is fed to a melt extruder, which is represented by an extruder. The PPS resin composition is heated to a temperature above the melting point of the PPS (preferably in a range of 300 to 350° C.), sufficiently melt-kneaded, and continuously extruded from a slit-shaped die. The extruded PPS resin composition is rapidly cooled to the glass transition temperature of the PPS or lower. Thus, a substantially unoriented (unstretched) sheet is obtained.

The laminated body comprises the thermoplastic resin sheet layer (the thermoplastic resin sheet layer having a heat of crystallization of 10 J/g or more as measured with a differential scanning calorimeter (DSC)) and the wet-laid polyphenylene sulfide fiber nonwoven layer having a heat of crystallization of 10 J/g or more as measured with a differential scanning calorimeter (DSC), the wet-laid polyphenylene sulfide fiber nonwoven layer being stacked on at least one surface of the thermoplastic resin sheet layer without an adhesive therebetween.

The PPS fibers, which are constituents of the wet-laid PPS fiber nonwoven layer, are preferably fibers melt spun from the above PPS resin, and such PPS fibers are excellent in heat resistance, chemical resistance, hydrolysis resistance, and dimensional stability under moisture. The resulting wet-laid nonwoven fabric, i.e., a wet-laid nonwoven fabric produced by forming a wet PPS fiber web by a wet-laid papermaking process, will have the same advantageous characteristics.

The weight average molecular weight of the PPS resin used to produce the PPS fibers is preferably 40000 to 60000. The PPS resin having a weight average molecular weight of 40000 or more can yield PPS fibers with good kinetic properties. The PPS resin having a weight average molecular weight of 60000 or less is preferred because a melt-spinning solution of such a PPS resin has a moderately reduced viscosity and does not require the use of a special spinning machine that is resistant to high pressure.

An important feature of the wet-laid PPS fiber nonwoven layer is that the heat of crystallization of the layer is 10 J/g or more. A wet-laid PPS fiber nonwoven layer with a heat of crystallization of less than 10 J/g will yield a laminated body that exhibits poor elongation during thermal forming. As a result, under heating at from 90° C. to 170° C., it will be impossible to perform deep drawing at a draw ratio of depth to diameter of 0.5 or more, or the yield (the ratio of the number of inspected and passed products to the total number of formed products) of deep drawing at a draw ratio of depth to diameter of 0.5 will result in less than 90%. The wet-laid nonwoven fabric having a heat of crystallization of 10 J/g or more can be produced using 80% by mass to 100% by mass of unstretched polyphenylene sulfide fibers and 20% by mass to 0% by mass of stretched polyphenylene sulfide fibers relative to the total mass of the nonwoven fabric. To achieve better formability, the wet-laid nonwoven fabric more preferably comprises 90% by mass to 100% by mass of unstretched polyphenylene sulfide fibers and 10% by mass to 0% by mass of stretched polyphenylene sulfide fibers.

The unstretched PPS fibers can be produced by melting a PPS resin in an extruder-fed spinning machine or the like, then spinning the molten resin from the die of the spinning machine or the like into fibers, and collecting the fibers without substantially stretching the fibers.

The stretched PPS fibers can be produced by melting a PPS resin in an extruder-fed spinning machine or the like, then spinning the molten resin from the spinning machine or the like into fibers, and stretching the fibers at a stretch ratio of 3.0 or more, preferably 5.5 or less, more preferably 3.5 to 5.0. The stretching may be single-step stretching or multi-step stretching in which stretching is performed twice or more. When two-step stretching is performed, it is preferred that in the first step, the fibers are stretched to 70% or more of the total stretch ratio, preferably 75 to 85% of the total stretch ratio, and that in the second step, the fibers are stretched to the remaining percentage. The resulting unstretched PPS fibers or stretched PPS fibers may be cut without crimping or cut after crimping.

In terms of the crimped or uncrimped fibers, each of these has different advantages. For example, in the production of the wet-laid nonwoven fabric, the crimped fibers are well entangled with each other, resulting in an increase in the strength of the fabric. The crimped fibers are therefore suitable for producing a wet-laid nonwoven fabric excellent in strength. On the other hand, the uncrimped fibers have good dispersibility in water, and are therefore suitable for producing a wet-laid nonwoven fabric that has a homogeneous structure with less irregularity.

The wet-laid polyphenylene sulfide fiber nonwoven fabric is a wet-laid nonwoven fabric produced by a wet-laid papermaking process using the PPS fibers. The advantages of such a wet-laid nonwoven fabric over a dry-laid nonwoven fabric produced by other nonwoven production processes such as a span bonding process and a needle punching process, are that a fiber sheet with a homogeneous structure can be easily produced. When such a fiber sheet is subjected to a forming process, the forming stress will be uniformly transmitted throughout the structural fibers with less occurrence of stress concentration, resulting in a high forming process yield.

Depending on the purpose, the wet-laid nonwoven layer may comprise fibers other than PPS fibers as long as the effects are not impaired. For example, the wet-laid nonwoven layer may comprise fibers comprising any of cellulose, polyethylene terephthalate, aramid, polyimide, wholly aromatic polyester, polytetrafluoroethylene, polyether ether ketone, and the like. That is, the wet-laid nonwoven layer may comprise 80 to 100% by mass of the unstretched polyphenylene sulfide fibers and 20 to 0% by mass of a combination of the stretched polyphenylene sulfide fibers and fibers other than PPS fibers. The amount of other fibers is 20% by mass or less, but the wet-laid nonwoven layer does not necessarily comprise the other fibers. To improve heat resistance and insulation, the wet-laid nonwoven layer may comprise mineral particles such as mica, titanium oxide, talc, kaolin, and aluminum hydroxide. When the wet-laid nonwoven layer further comprises fibers other than PPS fibers, the wet-laid nonwoven layer as a whole must have a heat of crystallization of 10 J/g or more as measured with a differential scanning calorimeter (DSC).

The single fiber fineness of the PPS fibers used to produce the wet-laid nonwoven fabric is preferably 0.05 dtex to 10 dtex. Thin PPS fibers having a fineness of less than 0.05 dtex tend to be entangled with each other and may result in decrease in uniform dispersibility. Thick PPS fibers having a fineness of more than 10 dtex are hard fibers and tend to have weak entanglement force and, if the entanglement force is too weak, sufficient paper strength may not be obtained and may result in a nonwoven fabric that is subject to tearing.

The fiber length of the PPS fibers used to produce the wet-laid nonwoven fabric is preferably such that 90% by mass or more of the PPS fibers contained in the fabric has a length of 1 to 20 mm. The PPS fibers of 1 mm or longer are efficiently entangled with each other, thereby imparting high strength to the wet-laid nonwoven fabric. The PPS fibers of 20 mm or shorter do not produce aggregates of fibers and enable prevention of irregularity or other defects that may occur in the wet-laid nonwoven fabric.

The mass per unit area of the wet-laid PPS fiber nonwoven fabric is preferably such that the lower limit of the mass per unit area is 5 g/m$^2$ or more, more preferably 10 g/m$^2$ or more, and that the upper limit of the mass per unit area is 200 g/m$^2$ or less, more preferably 120 g/m$^2$ or less. The thickness of the nonwoven fabric is preferably such that the lower limit of the thickness is 5 μm or more, more preferably 10 μm or more, and that the upper limit of the thickness is 500 μm or less, more preferably 300 μm or less.

An example of the process of producing the wet-laid PPS fiber nonwoven fabric will be described below. However, the process of producing the wet-laid PPS fiber nonwoven fabric is not limited thereto. The wet-laid nonwoven fabric is a nonwoven fabric produced by a papermaking process. A papermaking process is a conventional method of producing a nonwoven fabric involving laying a mixture of fibers and water on a wire mesh and dehydrating it under pressure or heat.

First, PPS fibers are dispersed in water to prepare a papermaking slurry. The amount of the fibers in the slurry is preferably 0.005 to 5% by mass based on the total mass of the papermaking slurry. The fibers in an amount of 0.005% by mass or more are efficiently laid in water in the papermaking process. The fibers in an amount of 5% by mass or less are well dispersed in water, yielding a wet-laid nonwoven fabric with a homogeneous structure.

The papermaking slurry may be prepared by separately preparing a slurry of stretched fibers and a slurry of unstretched fibers and then mixing the slurries in a paper machine, or alternatively by preparing a slurry containing stretched fibers and unstretched fibers. The separate preparation of each slurry of the fibers followed by mixing them is preferred in that the stirring time for each slurry can be independently controlled depending on the shape, properties and the like of each type of fibers. Preparation of a slurry containing both types of fibers is preferred in that the process is simplified.

To improve the dispersibility of the fibers in papermaking slurries, to the slurries may be added a dispersant or oil comprising a surfactant such as a cationic surfactant, an anionic surfactant and a nonionic surfactant; a defoaming agent, which prevents bubble formation or the like.

The papermaking slurry(ies) prepared as described above is(are) formed into a fiber web using a paper machine such as a cylinder paper machine, a Fourdrinier paper machine, and an inclined wire Fourdrinier paper machine, or a manual paper machine. The fiber web is dried with a Yankee dryer, a rotary dryer or the like to give a wet-laid nonwoven fabric. Calendering may subsequently be performed to smooth the surface of the produced wet-laid nonwoven fabric, to prevent lint formation on the surface, and to increase the density and the like. However, excessive thermocompression bonding will increase the crystallization of the PPS fibers that constitute the wet-laid nonwoven fabric and may deteriorate the formability of the fabric. Accordingly, the calendering must be limited to the extent that the heat of crystallization is maintained at 10 J/g or more. For this reason, it is preferred not to apply heat above the crystallization temperature of the PPS in the drying step and the calendering step for the wet-laid nonwoven fabric. The crystallization temperature can be determined by precisely weighing a sample, heating it under nitrogen at a heating rate of 10° C./min, and measuring the temperature in the observed main exothermic peak, using a differential scanning calorimeter, for example, "DSC-60" produced by Shimadzu Corporation.

When the drying temperature and the calendering temperature of the wet-laid PPS fiber nonwoven fabric are set at, for example, less than 120° C., the nonwoven fabric constituted by the PPS fibers maintained in a low crystalline state will be transferred to the bonding step. Consequently, the wet-laid PPS fiber nonwoven fabric is bonded with the thermoplastic resin sheet layer with a high adhesion force, which is advantageous in that the wet-laid PPS fiber nonwoven layer hardly separates from the thermoplastic resin sheet layer during processing in the subsequent steps including the forming step.

The laminated body is produced by stacking the wet-laid polyphenylene sulfide fiber nonwoven layer on at least one surface of the thermoplastic resin sheet layer without an adhesive therebetween.

The thermoplastic resin sheet layer alone or the wet-laid polyphenylene sulfide fiber nonwoven layer alone is insufficient to satisfy the general demands for the characteristics of a laminated insulation sheet due to several problems. For example, the wet-laid polyphenylene sulfide fiber nonwoven fabric has spaces between the fibers and thus its electric insulation performance is poor. Consequently, the wet-laid polyphenylene sulfide fiber nonwoven fabric alone cannot serve as an insulation sheet. On the other hand, the thermoplastic resin sheet alone can usually exhibit satisfactory electric insulation performance. However, the surface of the thermoplastic resin sheet is subject to scratching at the time of incorporation into an insulation system and, as a result of the scratching, several problems may occur. For example, the scratched part may have decreased insulation performance, cracking may occur from the scratched part, and the scratched part may have poor adhesiveness to a bonding resin at the time of fixing to an insulation system with the resin. At least one PPS fiber sheet that is stacked on and bonded with at least one thermoplastic resin sheet can satisfy the general demands for the characteristics such as electric insulation, working efficiency at the time of incorporation into an insulation system, and adhesiveness to a resin. In addition, during a thermal forming process, an insulation sheet formed from the laminated body of at least one PPS fiber sheet and at least one thermoplastic resin sheet does not stick fast to the die and thus can be easily removed from the die.

The method of laminating the wet-laid polyphenylene sulfide fiber nonwoven layer to the thermoplastic resin sheet layer, each produced as described above, will be described below. The laminated body comprising the wet-laid polyphenylene sulfide fiber nonwoven layer in a low crystalline state and the thermoplastic resin sheet layer in a low crystalline state is produced by direct thermocompression bonding of the layers without using an adhesive. Since no adhesive is used, the adverse effects of adhesives on the thermoformability of the low-crystalline-state materials constituting the laminated body can be avoided, and the laminated body produces excellent results in a forming process.

Preferably, there is not a big difference between the crystallinities of the wet-laid polyphenylene sulfide fiber nonwoven layer and the thermoplastic resin sheet layer. Accordingly, the heat of crystallization (Q2) of the wet-laid polyphenylene sulfide fiber nonwoven layer and the heat of crystallization (Q1) of the thermoplastic resin sheet layer preferably satisfy $0.5 < Q1/Q2 < 2.0$. When the difference between the crystallinities of the wet-laid polyphenylene sulfide fiber nonwoven layer and the thermoplastic resin sheet layer is small, the difference in shrinkage at the time of lamination and the subsequent forming process is reduced, as a result of which the yield (the ratio of the number of inspected and passed products to the total number of formed products) of deep drawing is further improved. The above range is more preferably $0.8 < Q1/Q2 < 1.3$.

The thermocompression bonding may be performed with a heating roller or a hot press. A preferred heating temperature is 90° C. to 170° C. When a heating roller is used, preferred bonding conditions are a linear pressure of 1 to 11.8 kN/cm and a speed of 1 m/min to 40 m/min. The thermocompression bonding may be performed in this manner to thermally fuse the layers and join them together. In this process, when the pressure is high, the layers can be joined together at a low temperature, and when the temperature is high, the layers can be joined together at a low pressure. When the temperature is high, the layers can be joined together at a high speed, and when the temperature is low, the layers will be joined together at a low speed. In any of these cases, care should be taken to ensure that the resulting laminated body must have a heat of crystallization that satisfies the specified range. For example, when the layers are joined together at a temperature of higher than 170° C., at a linear pressure of more than 11.8 kN/cm and at a speed of less than 1 m/min, several problems may occur: highly progressed crystallization may excessively lower the heat of crystallization, the PPS fiber sheet may be compressed into a thin film and fused to the fabric, and the density of the PPS fiber sheet may become very high, as a result of which the resin impregnation in the PPS fiber sheet at the time of use as an electric insulator may tend to be poor. Such a wet-laid polyphenylene sulfide fiber nonwoven layer compressed into a thin film may also be subject to cracking during a bending process. On the other hand, for example, when the layers are joined together at a temperature of lower than 90° C., at a linear pressure of less than 1.0 kN/cm and at a speed of more than 40 m/min, the adhesive strength between the wet-laid polyphenylene sulfide fiber nonwoven layer and the thermoplastic resin sheet layer is low, resulting in a laminated body unsuitable for practical use.

As described above, the heat of crystallization of each layer in the laminated body must be within the specified range. The heat of crystallization varies with the heats of crystallization of the raw materials, the lamination conditions, the process and the facilities. Based on this, although it cannot be generalized, when thermocompression bonding is performed at 120° C. or higher, the speed can be increased and thus the heating time is reduced, thereby preventing the reduction in the heat of crystallization. In particular, the thermocompression conditions are defined as such that after the lamination of the wet-laid PPS fiber nonwoven layer and the thermoplastic resin sheet layer, a heat of crystallization of 10 J/g or more is retained.

The surface of the thermoplastic resin sheet and/or the surface of the wet-laid PPS fiber nonwoven fabric may be subjected to, for example, corona treatment, plasma treatment, or the like, to introduce suitable functional groups such as —CO—, —C=O, and —COOH, into the surface. As a result, joining of the thermoplastic resin sheet layer and the wet-laid PPS fiber nonwoven layer can be performed under conditions of a lower temperature, a lower pressure, and a higher speed. This is advantageous because the resulting sheet has a reduced heat history, is in a low crystalline state, and is thus excellent in formability. Plasma treatment is more preferred than corona treatment because plasma treatment can control the types and the amounts of the functional groups to be introduced into a polymer surface by using an appropriate type of processing gas. Examples of the gas used in plasma treatment include oxygen gas, oxygen compound gas, argon gas, ammonia gas, nitro compound gas, a mixed gas thereof and the like. Among these, an appropriate gas may be selected and used.

Figure 1:
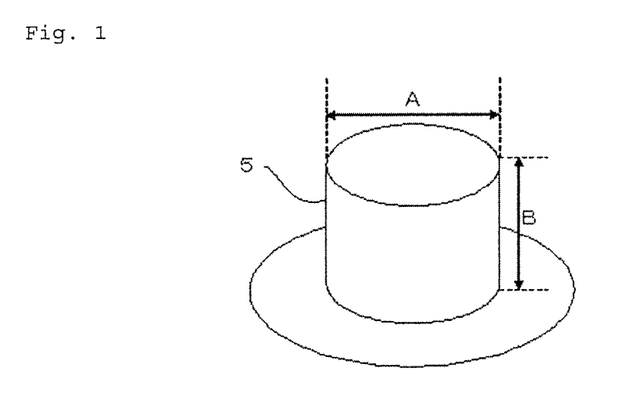
FIG. 1 represents a perspective view of a formed product of a laminated body.

The laminated body is excellent in three-dimensional formability. FIG. 1 shows a formed product (5) of the laminated body. The letter A in FIG. 1 indicates the drawing diameter, and the letter B in FIG. 1 indicates the depth. With the use of the cylindrical deep drawing die having a typical forming shape as shown in FIG. 1 under the conditions of a die temperature of 90° C. to 170° C. and a working speed of 7.5 mm/min, deep drawing can be performed at a draw ratio of depth to diameter of 0.5 or more, and the yield (the ratio of the number of inspected and passed products to the total number of formed products) of deep drawing at a draw ratio of depth to diameter ratio of 0.5 is 90% or more. More preferably, deep drawing can be performed at a draw ratio of depth to diameter of 0.7 or more, and the yield of deep drawing at a draw ratio of depth to diameter of 0.7 is 90% or more.

The term "deep drawing" herein include typical deep drawing, in which a blank is forced into or through a die to form a cup wall. The deep drawing also include formation of a three-dimensional object from a flat sheet, formation including stretching or compression of part of the formed object.

The forming methods include a forming method in which a sheet to be formed is softened by heating and formed into a desired shape by applying external force. Heat press forming, vacuum forming, pressure forming and the like can be employed.

EXAMPLES

Our laminated bodies and methods will be described in detail with reference to Examples, but this disclosure is not limited to thereto. Various alterations and modifications are possible without departing from the scope of the disclosure or the appended claims.

Measurement and Evaluation Methods
(1) Mass Per Unit Area

The measurement was performed in accordance with JIS L 1906: 2000. One test piece of 25 cm×25 cm in size was taken from a sample, and the mass (g) of the piece was measured in standard conditions and expressed in terms of a mass per $m^2$ ($g/m^2$).

(2) Thickness

The measurement was performed in accordance with JIS L 1913: 2000, Method A. Ten test pieces were taken from different parts of a sample. Using a thickness tester, a pressure of 0.5 kPa was applied to each of the pieces, the piece was held for 10 seconds to stabilize the thickness, and the thickness was measured. The mean value of the pieces was calculated.

(3) Dielectric Breakdown Strength

The measurement was performed in accordance with JIS K 6911: 1995. Five test pieces of about 10 cm×10 cm in size were taken from different parts of a sample. Each of the test pieces was sandwiched between disk-shaped electrodes with a diameter of 25 mm and a mass of 250 g. An alternating voltage with a frequency of 60 Hz was applied to the test piece in an air medium, and the voltage was increased at a rate of 0.25 kV/sec until dielectric breakdown occurred. The voltage at which dielectric breakdown occurred was measured. For the measurement, a dielectric breakdown-withstanding voltage tester (Yasuda Seiki Seisakusho LTD.) was used. The measured dielectric breakdown voltage was divided by the measured thickness at the center of the sample to determine the dielectric breakdown strength.

(4) Forming Test 1

Figure 2:
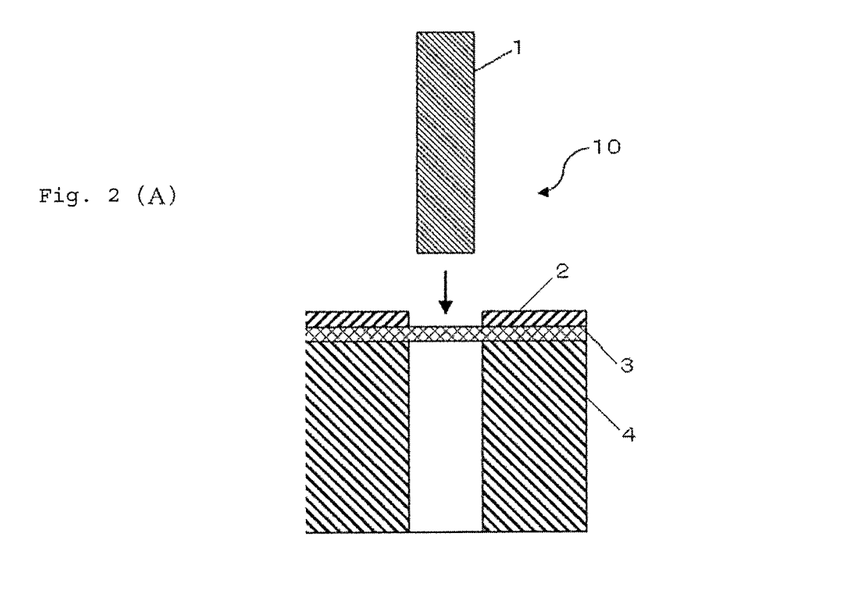
FIG. 2A is before pressing and FIG. 2B is after pressing.

The test was performed using a cylindrical deep drawing die (10) comprising a die cavity (4), a blank holder (2), a punch (1) of a press forming machine as shown in FIG. 2. Deep drawing of a sheet-shaped laminated body (3) was performed by moving down the punch (1) of a press forming machine. The drawing diameter of the punch (1) was 8.0 mm, and the drawing depth of the punch (1) was up to 15 mm. The die temperature was 100° C. The working speed was 7.5 mm/min. The maximum drawing depth at which forming without tearing or wrinkle was possible was determined.

(5) Forming Test 2-1

The test was performed using a cylindrical deep drawing die (10) comprising a die cavity (4), a blank holder (2), a punch (1) of a press forming machine as shown in FIG. 2. Deep drawing of a sheet-shaped laminated body (3) was performed by moving down the punch (1) of a press forming machine. The drawing diameter of the punch (1) was 8.0 mm, and the drawing depth of the punch (1) was 4.0 mm. The die temperature was 100° C. The working speed was 7.5 mm/min. Products that had no tear or wrinkle after the forming process and was precisely formed in detail was regarded as passed. The yield was defined as the ratio of the number of products that passed the test to 100 formed products.

(6) Forming Test 2-2

The test was performed using a cylindrical deep drawing die (10) comprising a die cavity (4), a blank holder (2), a punch (1) of a press forming machine as shown in FIG. 2. Deep drawing of a sheet-shaped laminated body (3) was performed by moving down the punch (1) of a press forming machine. The drawing diameter of the punch (1) was 8.0 mm, and the drawing depth of the punch (1) was 5.6 mm. The die temperature was 100° C. The working speed was 7.5 mm/min. Products that had no tear or wrinkle after the forming process and was precisely formed in detail was regarded as passed. The yield was defined as the ratio of the number of products that passed the test to 100 formed products.

(7) Measurement of Heat of Crystallization of Wet-laid Polyphenylene Sulfide Fiber Nonwoven Layer A small portion of a wet-laid polyphenylene sulfide fiber nonwoven layer was taken from a laminated body using tweezers and the portion was precisely weighed to about 2 mg. The portion was heated at a heating rate of 10° C./min under nitrogen in a differential scanning calorimeter (DSC-60, produced by Shimadzu Corporation), and the calorific value (J/g) of the observed main exothermic peak was determined.

(8) Measurement of Heat of Crystallization of Thermoplastic Resin Sheet Layer

After removing a wet-laid polyphenylene sulfide fiber nonwoven layer from a laminated body using tweezers or the like, a small portion of a thermoplastic resin sheet layer was taken and the portion was precisely weighed to about 2 mg. The portion was heated at a heating rate of 10° C./min under nitrogen in a differential scanning calorimeter (DSC-60, produced by Shimadzu Corporation), and the calorific value (J/g) of the observed main exothermic peak was determined.

Example 1

(1) Production of Wet-laid PPS Fiber Nonwoven Fabric

"TORCON" (registered trademark) (product number: S111, produced by Toray Industries, Inc.) having a single fiber fineness of 3.0 dtex and a cut length of 6 mm was used as unstretched PPS fibers. The unstretched PPS fibers were dispersed in water to prepare a papermaking dispersion. This papermaking dispersion was fed to a small-scale paper machine (produced by Kumagai Riki Kogyo Co., Ltd.) in such an amount that the resulting fabric had 50 g/m$^2$. The small-scale paper machine had a size of 25 cm×25 cm and a height of 40 cm and was equipped with a manual papermaking wire of 140 mesh size on the bottom. Water was further added to the papermaking dispersion to a total volume of 20 L, and the dispersion was sufficiently stirred with a stirrer. The water was drained from the small-scale paper machine, and the wet paper web formed on the papermaking wire was transferred to a filter paper. The wet paper web was fed to a rotary dryer together with the filter paper, and dried at a temperature of 100° C., at a processing speed of 0.5 m/min, and at a length of the processing line of 1.25 m (processing time: 2.5 min), and this drying procedure was repeated once more. Thus, a wet-laid polyphenylene sulfide fiber nonwoven fabric of 130 μm thickness was produced.

(2) Production of Unstretched PPS Film (Unstretched Thermoplastic Resin Sheet)

Into an autoclave with a stirrer were fed 33 kg (250 mol) of sodium sulfide (containing 40% by mass of water of crystallization), 100 g of sodium hydroxide, 36 kg (250 mol) of sodium benzoate, and 79 kg of N-methyl-2-pyrrolidone (hereinafter abbreviated to NMP). The mixture was stirred while the temperature was gradually raised to 205° C. to dehydrate the mixture. To the residual mixture, 38 kg (255 mol) of 1,4-dichlorobenzene and 20 kg of NMP were added, and the mixture was heated at 265° C. for 4 hours. The reaction product was washed 8 times with boiling water to give 21 kg of a PPS resin composition having a melt viscosity of 3200 poise.

The produced PPS resin composition was dried under reduced pressure at 180° C. for 2 hours. To the composition, 0.5% by mass of a fine silica powder with an average particle diameter of 0.1 μm was added, and the mixture was melt-extruded at a temperature of 310° C. into a form of gut strings. The gut strings were cut into chips. The chips were dried under reduced pressure at 180° C. for 3 hours. The chips were fed to the hopper of an extruder, melted at 320° C., and extruded from a T-shaped die into a sheet. The sheet was cooled and solidified on a metal drum of which the surface temperature was maintained at 30° C. Thus, an unstretched PPS film of 50 μm thickness was produced.

(3) Production of Laminated Body

The wet-laid polyphenylene sulfide fiber nonwoven fabric was stacked on the unstretched PPS film, and passed through a calendering machine (made by YURI ROLL MACHINE Co., Ltd.) equipped with a metallic roll and a paper roll so that the fabric and film were bonded by thermocompression bonding to give a laminated body. The calendering conditions in this Example were a temperature of 110° C., a pressure of 1.3 kN/cm, and a rotational speed of the rolls of 7 m/min. Calendering was performed such that the unstretched PPS film was in contact with the paper roll of the calendering machine.

Example 2

"TORCON" (product number: S301, produced by Toray Industries, Inc.) having a single fiber fineness of 1.0 dtex and a cut length of 6 mm was used as stretched PPS fibers. "TORCON" (registered trademark) (product number: S111, produced by Toray Industries, Inc.) having a single fiber fineness of 3.0 dtex and a cut length of 6 mm was used as unstretched PPS fibers. The production of a wet-laid nonwoven fabric was performed in the same manner as in Example 1 except that the stretched PPS fibers and the unstretched PPS fibers were mixed at a mass percent ratio of 10:90 and dispersed in water to prepare a papermaking dispersion. Thus, a wet-laid PPS fiber nonwoven fabric of 120 μm thickness was produced. Further, an unstretched PPS film (unstretched thermoplastic resin sheet) of 50 μm thickness was also produced.

The wet-laid polyphenylene sulfide fiber nonwoven fabric was stacked on the unstretched PPS film, and passed through a calendering machine (made by YURI ROLL MACHINE Co., Ltd.) equipped with a metallic roll and a paper roll so that the fabric and film were bonded by thermocompression bonding to give a laminated body. The calendering conditions in this Example were a temperature of 130° C., a pressure of 1.3 kN/cm, and a rotational speed of the rolls of 3 m/min. Calendering was performed such that the unstretched PPS film was in contact with the paper roll of the calendering machine.

Example 3

A wet-laid PPS fiber nonwoven fabric and an unstretched PPS film were produced in the same manner as in Example 2 except that the mixing ratio of the stretched PPS fibers and the unstretched PPS fibers used to produce the wet-laid PPS fiber nonwoven fabric was changed.

The wet-laid polyphenylene sulfide fiber nonwoven fabric was stacked on the unstretched PPS film, and passed through a calendering machine (made by YURI ROLL MACHINE Co., Ltd.) equipped with a metallic roll and a paper roll so that the fabric and film were bonded by thermocompression bonding to give a laminated body. The calendering conditions in this Example were a temperature of 130° C., a pressure of 1.3 kN/cm, and a rotational speed of the rolls of 3 m/min. Calendering was performed such that the unstretched PPS film was in contact with the paper roll of the calendering machine.

Example 4

(1) Production of Wet-laid PPS Fiber Nonwoven Fabric

A wet-laid PPS fiber nonwoven fabric was produced in the same manner as in Example 1.

(2) Production of Unstretched PET Film (Unstretched Thermoplastic Resin Sheet)

To a mixture of 194 parts by mass of dimethyl terephthalate and 124 parts by mass of ethylene glycol was added 0.1 parts by mass of magnesium acetate tetrahydrate. A transesterification reaction was allowed to proceed while methanol was removed by distillation at 140 to 230° C. To this were added a solution of 0.05 parts by mass of trimethyl phosphate in ethylene glycol and 0.05 parts by mass of antimony trioxide, and the mixture was stirred for 5 minutes. While the resulting low polymer was stirred at 30 rpm, the reaction system was gradually heated from 230° C. to 290° C. and the pressure was decreased to 0.1 kPa. The time to reach the final temperature and the final pressure was set at 60 minutes. The polymerization reaction was allowed to proceed for 3 hours. After reaching the predetermined stirring torque, the reaction system was purged with nitrogen. The reaction system was brought back to normal pressure to stop the polycondensation reaction. The resulting polymer was extruded in cold water into a form of strands and the strands were immediately cut into pellets. Thus, polyethylene terephthalate (PET) pellets having an intrinsic viscosity of 0.63 dL/g and a melting temperature of 257° C. were produced. The pellets were dried under reduced pressure at 180° C. for 3 hours. The pellets were fed to the hopper of an extruder, melted at 280° C., and extruded from a T-shaped die into a sheet. The sheet was cooled and solidified on a metal drum of which the surface temperature was maintained at 30° C. Thus, an unstretched PET film of 50 μm thickness was produced.

(3) Production of Laminated Body

The wet-laid polyphenylene sulfide fiber nonwoven fabric was stacked on the unstretched PET film, and passed through a calendering machine (made by YURI ROLL MACHINE Co., Ltd.) equipped with a metallic roll and a paper roll so that the fabric and film were bonded by thermocompression bonding to give a laminated body. The calendering conditions in this Example were a temperature of 90° C., a pressure of 1.3 kN/cm, and a rotational speed of the rolls of 7 m/min. Calendering was performed such that the unstretched PET film was in contact with the paper roll of the calendering machine.

Example 5

A wet-laid PPS fiber nonwoven fabric and an unstretched PPS film were produced in the same manner as in Example 2. The unstretched PPS film was stacked on the wet-laid polyphenylene sulfide fiber nonwoven fabric to produce a two-layer structure, and another piece of the same wet-laid polyphenylene sulfide fiber nonwoven fabric was stacked on the unstretched PPS film of the two-layer structure to produce a three-layer structure. In the three-layer structure, the layers were stacked in the following order from the bottom of the structure: the wet-laid polyphenylene sulfide fiber nonwoven fabric, the unstretched PPS film, and the wet-laid polyphenylene sulfide fiber nonwoven fabric. The three-layer structure was passed through a calendering machine (made by YURI ROLL MACHINE Co., Ltd.) equipped with a metallic roll and a paper roll so that the fabrics and film were bonded by thermocompression bonding to give a three-layer laminated body. The calendering conditions in this Example were a temperature of 130° C., a pressure of 1.3 kN/cm, and a rotational speed of the rolls of 3 m/min. The measurement of the heat of crystallization of the wet-laid polyphenylene sulfide fiber nonwoven layer of the produced laminated body was performed on the wet-laid nonwoven layer that had been in contact with the metallic roll when passed through the calendering machine.

Example 6

A wet-laid PPS fiber nonwoven fabric and an unstretched PPS film were produced in the same manner as in Example 3. The wet-laid polyphenylene sulfide fiber nonwoven fabric was stacked on the unstretched PPS film, and passed through a calendering machine (made by YURI ROLL MACHINE Co., Ltd.) equipped with a metallic roll and a paper roll so that the fabric and film were bonded by thermocompression bonding to give a laminated body. The calendering conditions in this Example were a temperature of 110° C., a pressure of 1.3 kN/cm, and a rotational speed of the rolls of 7 m/min. Calendering was performed such that the unstretched PPS film was in contact with the paper roll of the calendering machine.

Example 7

A wet-laid PPS fiber nonwoven fabric and an unstretched PPS film were produced in the same manner as in Example 1. The wet-laid polyphenylene sulfide fiber nonwoven fabric was stacked on the unstretched PPS film, and passed through a calendering machine (made by YURI ROLL MACHINE Co., Ltd.) equipped with a metallic roll and a paper roll so that the fabric and film were bonded by thermocompression bonding to give a laminated body. Before the thermocompression bonding, the unstretched PPS film alone was made in contact with a preheating roller at 145° C. The calendering conditions were a temperature of 90° C., a pressure of 1.3 kN/cm, and a rotational speed of the rolls of 7 m/min. Calendering was performed such that the unstretched PPS film was in contact with the paper roll of the calendering machine.

Example 8

A wet-laid PPS fiber nonwoven fabric and an unstretched PPS film were produced in the same manner as in Example 1. The wet-laid polyphenylene sulfide fiber nonwoven fabric was stacked on the unstretched PPS film, and passed through a calendering machine (made by YURI ROLL MACHINE Co., Ltd.) equipped with a metallic roll and a paper roll so that the fabric and film were bonded by thermocompression bonding to give a laminated body. The calendering conditions in this Example were a temperature of 170° C., a pressure of 1.3 kN/cm, and a rotational speed of the rolls of 10 m/min. Calendering was performed such that the unstretched PPS film was in contact with the paper roll of the calendering machine.

Comparative Example 1

A laminated body was produced in the same manner as in Example 1 except that the calendering conditions for producing the laminated body were set at a temperature of 180° C., a pressure of 1.3 kN/cm, and a rotational speed of the rolls of 3 m/min.

Comparative Example 2

A wet-laid PPS fiber nonwoven fabric and an unstretched PPS film were produced in the same manner as in Example 2 except that the mixing ratio of the stretched PPS fibers and the unstretched PPS fibers used to produce the wet-laid PPS fiber nonwoven fabric was changed. The wet-laid polyphenylene sulfide fiber nonwoven fabric was stacked on the unstretched PPS film, and passed through a calendering machine (made by YURI ROLL MACHINE Co., Ltd.) equipped with a metallic roll and a paper roll so that the fabric and film were bonded by thermocompression bonding to give a laminated body. The calendering conditions in this Comparative Example were a temperature of 150° C., a pressure of 1.3 kN/cm, and a rotational speed of the rolls of 3 m/min. Calendering was performed such that the unstretched PPS film was in contact with the paper roll of the calendering machine.

Comparative Example 3

"TORCON" (product number: S111, produced by Toray Industries, Inc.) having a single fiber fineness of 3.0 dtex and a cut length of 51 mm was used as unstretched PPS fibers. The unstretched PPS fibers were needle punched at a needle depth of 5 mm and a needle density of 150 needles/cm$^2$, and were calendered at 240° C. to give a needle-punched PPS fiber nonwoven fabric having an apparent specific gravity of 0.7 g/cm$^3$ and a thickness of 100 μm. An unstretched PPS film was produced in the same manner as in Example 1. The needle-punched PPS fiber nonwoven fabric was stacked on the unstretched PPS film, and passed through a calendering machine (made by YURI ROLL MACHINE Co., Ltd.) equipped with a metallic roll and a paper roll so that the fabric and film were bonded by thermocompression bonding to give a laminated body. The calendering conditions in this Comparative Example were a temperature of 240° C., a pressure of 0.1 kN/cm, and a rotational speed of the rolls of 1 m/min. Calendering was performed such that the unstretched PPS film was in contact with the paper roll of the calendering machine.

Comparative Example 4

"TORCON" (product number: S301, produced by Toray Industries, Inc.) having a single fiber fineness of 1.0 dtex and a cut length of 51 mm was used as stretched PPS fibers. "TORCON" (registered trademark) (product number: S111, produced by Toray Industries, Inc.) having a single fiber fineness of 3.0 dtex and a cut length of 51 mm was used as unstretched PPS fibers. Production of a laminated body was performed in the same manner as in Comparative Example 3 except that the stretched PPS fibers and the unstretched PPS fibers were mixed at a mass percent ratio of 50:50.

Comparative Example 5

A laminated body was produced in the same manner as in Comparative Example 3 except that, instead of the unstretched PPS fibers, "TORCON" (registered trademark) (product number: S301, produced by Toray Industries, Inc.) having a single fiber fineness of 1.0 dtex and a cut length of 51 mm was used as stretched PPS fibers.

Comparative Example 6

"TORCON" (product number: S111, produced by Toray Industries, Inc.) having a single fiber fineness of 3.0 dtex and a cut length of 51 mm was used as unstretched PPS fibers, as with the case of Comparative Example 3. The unstretched PPS fibers were needle punched at a needle depth of 5 mm and a needle density of 150 needles/cm$^2$, but was not subjected to calendering. Thus, a needle-punched PPS fiber nonwoven fabric was produced. Using the produced needle-punched nonwoven fabric, a laminated body was produced in the same manner as in Comparative Example 3. The calendering conditions for the lamination were a temperature of 130° C., a pressure of 1.3 kN/cm, and a rotational speed of the rolls of 7 m/min.

Comparative Example 7

A linear polyphenylene sulfide resin (product number: E2280, produced by Toray Industries, Inc.) having a melt flow rate (MFR) of 160 g/10 min was dried in nitrogen atmosphere at 160° C. for 10 hours. The PPS resin was melted in an extruder and spun from a rectangular spinneret with a hole diameter of 0.30 mm at a spinning temperature of 325° C. and at an extrusion rate per hole of 1.38 g/min. The continuous filaments extruded in an atmosphere at room temperature of 20° C. were pulled and stretched at an ejector pressure of 0.25 MPa with a rectangular ejector disposed immediately below the spinneret at a distance of 550 mm from the spinneret. The stretched filaments were collected on a moving net to form a PPS fiber web. The produced filaments had a single fiber fineness of 2.4 dtex on the average. The web was bonded by thermocompression bonding (thermal bonding) at a linear pressure of 1000 N/cm and a temperature of 270° C. with in-line embossing rolls composed of an upper metallic embossing roll having an engraved polka dot pattern and a compression-bonding area of 12% and a lower flat metallic roll. The resulting fabric was transferred to a net-conveyor hot-air dryer set at 270° C. and heat-treated for 20 minutes to give a spunbonded PPS fiber nonwoven fabric having a mass per unit area of 53 g/m$^2$.

An unstretched PPS film was produced in the same manner as in Example 1. The spunbonded PPS fiber nonwoven fabric was stacked on the unstretched PPS film, and passed through a calendering machine (made by YURI ROLL MACHINE Co., Ltd.) equipped with a metallic roll and a paper roll so that the fabric and film were bonded by thermocompression bonding to give a laminated body. The calendering conditions in this Comparative Example were a temperature of 130° C., a pressure of 1.3 kN/cm, and a rotational speed of the rolls of 7 m/min. Calendering was performed such that the unstretched PPS film was in contact with the paper roll of the calendering machine.

Comparative Example 8

A linear polyphenylene sulfide resin (product number: E2280, produced by Toray Industries, Inc.) having a MFR of 160 g/10 min was dried in nitrogen atmosphere at 160° C. for 10 hours. The PPS resin was melted in an extruder and spun from a rectangular spinneret with a hole diameter of 0.30 mm at a spinning temperature of 325° C. and at an extrusion rate per hole of 1.38 g/min. The continuous filaments extruded in an atmosphere at room temperature of 20° C. were pulled and stretched at an ejector pressure of 0.25 MPa with a rectangular ejector disposed immediately below the spinneret at a distance of 550 mm from the spinneret. The stretched filaments were collected on a moving net to form a PPS fiber web. The produced filaments had a single fiber fineness of 2.4 dtex on the average.

An unstretched PPS film was produced in the same manner as in Example 1. The PPS fiber web was stacked on the unstretched PPS film, and passed through a calendering machine (made by YURI ROLL MACHINE Co., Ltd.) equipped with a metallic roll and a paper roll so that the fiber web and film were bonded by thermocompression bonding to give a laminated body. The calendering conditions in this Comparative Example were a temperature of 130° C., a pressure of 1.3 kN/cm, and a rotational speed of the rolls of 7 m/min. Calendering was performed such that the unstretched PPS film was in contact with the paper roll of the calendering machine.

Comparative Example 9

A wet-laid PPS fiber nonwoven fabric was produced in the same manner as in Example 2 except that the mixing ratio of the stretched PPS fibers and the unstretched PPS fibers used to produce the wet-laid PPS fiber nonwoven fabric was changed. On one side of the wet-laid PPS fiber nonwoven fabric, an uncured silicone rubber was uniformly applied with a bar coater to an average thickness of 100 µm. The fiber sheet was left to stand for 5 minutes in a dryer in which the temperature was adjusted to 150° C. to allow the silicone rubber to cure. Thus, a laminated body was produced. The average thickness of the silicone layer after curing was 100 µm, and the mass per unit area of the applied silicone was 128 g/m$^2$.

Comparative Example 10

A wet paper web was produced by performing papermaking in the same manner as in Example 1 except that the mixing ratio of the stretched PPS fibers and the unstretched PPS fibers used to produce the wet-laid PPS fiber nonwoven fabric was changed to 50:50. The wet paper web was fed to a rotary dryer together with a filter paper, and dried at a temperature of 140° C., at a processing speed of 0.5 m/min, and at a length of the processing line of 1.25 m (processing time: 2.5 min), and this drying procedure was repeated once more. Thus, a wet-laid polyphenylene sulfide fiber nonwoven fabric was produced. The dried wet-laid nonwoven fabric was passed through a calendering machine (made by YURI ROLL MACHINE Co., Ltd.) equipped with a metallic roll and a paper roll. The calendering conditions were a temperature of 160° C., a pressure of 3.4 kN/cm, and a rotational speed of the rolls of 5 m/min. Calendering was performed twice with the front side face up and twice with the back side face up, to finish the wet-laid nonwoven fabric. Using the produced wet-laid PPS fiber nonwoven fabric and using, as a PPS film, a one-side corona-treated product, "TORELINA" (product number: #60-3A30, produced by Toray Industries, Inc.) having a thickness of 60 µm, the production of a laminated body was performed as follows. Plasma treatment with an irradiation intensity of 650 W·min/m$^2$ was performed on one side of each of the wet-laid PPS fiber nonwoven fabric and the PPS film. The wet-laid PPS fiber nonwoven fabric was stacked on the PPS film so that the plasma-treated surfaces of the fabric and the film were in contact with each other. The stacked fabric and film were passed through a calendering machine (made by YURI ROLL MACHINE Co., Ltd.) equipped with a metallic roll and a paper roll so that the fabric and film were bonded by thermocompression bonding to give a laminated body. The calendering conditions were a temperature of 210° C., a pressure of 1.3 kN/cm, and a rotational speed of the rolls of 7 m/min. Calendering was performed such that the PPS film was in contact with the paper roll of the calendering machine.

Comparative Example 11

A wet paper web was produced by performing papermaking in the same manner as in Example 1 except that the mixing ratio of the stretched PPS fibers and the unstretched PPS fibers used to produce the wet-laid PPS fiber nonwoven fabric was changed to a mass percent ratio of 75:25. The wet paper web was fed to a rotary dryer together with a filter paper, and dried at a temperature of 140° C., at a processing speed of 0.5 m/min, and at a length of the processing line of 1.25 m (processing time: 2.5 min), and this drying procedure was repeated once more. Thus, a wet-laid polyphenylene sulfide fiber nonwoven fabric was produced. The dried wet-laid nonwoven fabric was passed through a calendering machine (made by YURI ROLL MACHINE Co., Ltd.) equipped with a metallic roll and a paper roll. The calendering conditions were a temperature of 160° C., a pressure of 3.4 kN/cm, and a rotational speed of the rolls of 5 m/min. Calendering was performed twice with the front side face up and twice with the back side face up, to finish the wet-laid nonwoven fabric. Using the produced wet-laid PPS fiber nonwoven fabric and using, as a PPS film, a one-side corona-treated product, "TORELINA" (product number: #60-3A30, produced by Toray Industries, Inc.) having a thickness of 60 µm, the production of a laminated body was performed as follows. An adhesive was uniformly applied to one side of the PPS film so that the amount of the applied adhesive was 15 g/m$^2$, and the PPS film was left to stand for 10 seconds. On the adhesive-applied surface, the produced wet-laid nonwoven fabric was stacked, and the stacked film and fabric were pressed under a pressure of 1.3 Pa for 6 hours to be joined together. The adhesive used was "Spray Adhesive 55" (produced by Sumitomo 3M Ltd.) of which the components were 10% of acrylic rubber, 54% of an organic solvent and 36% of isohexane gas.

Evaluation Results

Table 1 shows the evaluation results of Examples 1 to 8 and Comparative Examples 1 to 11.

TABLE 1

| | PPS fiber sheet layer | | | | | Thermoplastic resin sheet layer | |
|---|---|---|---|---|---|---|---|
| | Polymer | Unstretched fiber mixing ratio (wt %) | Stretched fiber mixing ratio (wt %) | Type | Heat of crystallization Q2 (J/g) | Polymer | Heat of crystallization Q1 (J/g) |
| Example 1 | PPS | 100 | 0 | Wet-laid nonwoven | 25 | PPS | 26 |
| Example 2 | PPS | 90 | 10 | Wet-laid nonwoven | 14 | PPS | 16 |
| Example 3 | PPS | 80 | 20 | Wet-laid nonwoven | 10 | PPS | 12 |
| Example 4 | PPS | 100 | 0 | Wet-laid nonwoven | 25 | PET | 24 |
| Example 5 | PPS | 90 | 10 | Wet-laid nonwoven | 14 | PPS | 17 |
| Example 6 | PPS | 80 | 20 | Wet-laid nonwoven | 12 | PPS | 26 |
| Example 7 | PPS | 100 | 0 | Wet-laid nonwoven | 24 | PPS | 11 |
| Example 8 | PPS | 100 | 0 | Wet-laid nonwoven | 13 | PPS | 14 |
| Comparative Example 1 | PPS | 100 | 0 | Wet-laid nonwoven | 8 | PPS | 10 |
| Comparative Example 2 | PPS | 60 | 40 | Wet-laid nonwoven | 7 | PPS | 12 |
| Comparative Example 3 | PPS | 100 | 0 | Needle-punched Nonwoven | 3 | PPS | 3 |
| Comparative Example 4 | PPS | 50 | 50 | Needle-punched Nonwoven | 2 | PPS | 3 |
| Comparative Example 5 | PPS | 0 | 100 | Needle-punched Nonwoven | 0 | PPS | 3 |
| Comparative Example 6 | PPS | 100 | 0 | Needle-punched Nonwoven | 24 | PPS | 24 |
| Comparative Example 7 | PPS | — | — | Spunbonded nonwoven (heat-setting) | 0 | PPS | 24 |
| Comparative Example 8 | PPS | — | — | Spunbonded nonwoven (no heat-setting) | 28 | PPS | 24 |
| Comparative Example 9 | PPS | 50 | 50 | Wet-laid nonwoven | 0 | — | — |
| Comparative Example 10 | PPS | 50 | 50 | Wet-laid nonwoven | 0 | PPS | 0 |
| Comparative Example 11 | PPS | 25 | 75 | Wet-laid nonwoven | 0 | PPS | — |

| | | Forming test of laminated body | | | Thermocompression bonding conditions | | |
|---|---|---|---|---|---|---|---|
| | Q1/Q2 | Forming test 1 (draw ratio of depth/diameter) | Forming test 2-1 yield (%) | Forming test 2-2 yield (%) | Thermocompression bonding temperature (° C.) | Thermocompression bonding speed (m/min) | Thermocompression bonding pressure (kN/cm) |
| Example 1 | 1.0 | 1.9 | 100 | 100 | 110 | 7 | 1.3 |
| Example 2 | 1.1 | 1.3 | 100 | 100 | 130 | 3 | 1.3 |
| Example 3 | 1.2 | 0.8 | 100 | 100 | 130 | 3 | 1.3 |
| Example 4 | 1.0 | 1.9 | 100 | 100 | 90 | 7 | 1.3 |
| Example 5 | 1.2 | 1.3 | 100 | 100 | 130 | 3 | 1.3 |
| Example 6 | 2.2 | 0.7 | 95 | 95 | 110 | 7 | 1.3 |
| Example 7 | 0.5 | 0.7 | 95 | 95 | 90 | 7 | 1.3 |
| Example 8 | 1.1 | 0.8 | 100 | 100 | 170 | 10 | 1.3 |
| Comparative Example 1 | 1.3 | 0.5 | 66 | 0 | 180 | 3 | 1.3 |
| Comparative Example 2 | 1.7 | 0.1 | 0 | 0 | 150 | 3 | 1.3 |
| Comparative Example 3 | 1.0 | 0.3 | 0 | 0 | 240 | 1 | 0.1 |
| Comparative Example 4 | 1.5 | 0.1 | 0 | 0 | 240 | 1 | 0.1 |
| Comparative Example 5 | — | 0 | 0 | 0 | 240 | 1 | 0.1 |
| Comparative Example 6 | 1.0 | 1.9 | 85 | 82 | 130 | 7 | 1.3 |
| Comparative Example 7 | — | 0 | 0 | 0 | 130 | 7 | 1.3 |
| Comparative Example 8 | 0.9 | 1.9 | 84 | 86 | 130 | 7 | 1.3 |
| Comparative Example 9 | — | 0.3 | 0 | 0 | — | — | — |
| Comparative Example 10 | — | 0.1 | 0 | 0 | 210 | 7 | 3.4 |
| Comparative Example 11 | — | 0.1 | 0 | 0 | — | — | — |

Example 5 is a three-layer laminated body.

The laminated bodies produced in Examples 1 to 8 contained, as constituent materials, the wet-laid PPS fiber nonwoven layer and the thermoplastic resin sheet layer both having a heat of crystallization of 10 J/g or more. The laminated bodies were able to be formed into products at a high draw ratio of depth to diameter and shown to have an excellent three-dimensional formability. The laminated bodies also exhibited low variability in the shapes of the formed products and a high forming process yield. In particular, Examples 1 to 5 and 8 had the heat of crystallization (Q2) of the wet-laid PPS fiber nonwoven layer and the heat of crystallization (Q1) of the thermoplastic resin sheet layer that satisfy $0.8<Q1/Q2<1.3$. The heats of crystallization that satisfy the formula contributed to a small difference in shrinkage at the time of the lamination and the subsequent forming, and also contributed to a high draw ratio of depth to diameter and a high deep drawing yield (the ratio of the number of inspected and passed products to the total number of formed products) at the time of the deep drawing. The laminated bodies of Examples 1 and 4, which contained the wet-laid PPS fiber nonwoven layer and the thermoplastic resin sheet layer both having a heat of crystallization of 24 J/g or more, exhibited a very high draw ratio of depth to diameter of 1.9, indicating markedly excellent formability. All of the laminated bodies in Examples had a dielectric breakdown strength of 50 kV/mm or more, and thus are suitable as an insulating paper.

On the other hand, the laminated body of Comparative Example 1 was produced at a high calendering temperature (thermocompression-bonding temperature) of 180° C. Consequently, the crystallization proceeded and the formability was deteriorated, resulting in a low draw ratio of depth to diameter and a poor forming process yield.

Comparative Example 2 contained a large proportion of the stretched PPS fibers in the wet-laid PPS fiber nonwoven fabric. Consequently, the laminated body showed a low heat of crystallization and poor formability, resulting in a very low draw ratio of depth to diameter and a very poor forming process yield.

The laminated body of Comparative Example 3 was produced at a high calendering temperature (thermocompression-bonding temperature) of 240° C. Consequently, crystallization proceeded and formability was deteriorated, resulting in a low draw ratio of depth to diameter and a very poor forming process yield.

The laminated body of Comparative Example 4 contained a small proportion of the unstretched PPS fibers and was produced at a high calendering temperature (thermocompression-bonding temperature) of 240° C. Consequently, as with Comparative Example 3, crystallization proceeded and formability was deteriorated, resulting in incapability of deep drawing and a very poor forming process yield.

Comparative Example 5 consisted of 100% of the stretched PPS fibers. Consequently, formability was deteriorated, resulting in a very low draw ratio of depth to diameter and a very poor forming process yield.

The laminated body of Comparative Example 6 was produced at an adequate calendering temperature (thermocompression-bonding temperature). However, since a needle-punched nonwoven fabric generally lacks homogeneity in the sheet, stress applied during the forming process was not uniformly transmitted throughout the laminated body, resulting in a poor forming process yield.

Comparative Examples 7 and 8 are examples in which the spunbonded nonwoven fabric was used instead of the wet-laid PPS fiber nonwoven fabric. The laminated bodies were produced at an adequate calendering temperature (thermocompression-bonding temperature). However, in Comparative Example 7, heat-setting of the filament web was performed and, consequently, the crystallization proceeded during thermocompression bonding of the PPS fiber web and formability was deteriorated, resulting in incapability of deep drawing and a very poor forming process yield. On the other hand, heat-setting of the PPS fiber web was not performed for Comparative Example 8. However, Comparative Example 8 is a needle-punched nonwoven fabric, which lacks homogeneity in the sheet and, consequently, stress applied during the forming process was not uniformly transmitted throughout the laminated body, resulting in a poor forming process yield.

In Comparative Example 9, crystallization of the wet-laid PPS fiber nonwoven fabric proceeded during the process of curing the silicone rubber applied to the wet-laid PPS fiber nonwoven fabric. In addition to this, generally a silicone rubber has poor elongation properties. Consequently, the laminated body resulted in a low draw ratio of depth to diameter and a very poor forming process yield.

In Comparative Example 10, plasma treatment was performed on the wet-laid PPS fiber nonwoven fabric and the PPS film. However, the laminated body contained a large proportion of the stretched PPS fibers in the wet-laid PPS fiber nonwoven fabric, and was produced at a high calendering temperature (thermocompression-bonding temperature) of 210° C. Consequently, crystallization proceeded and formability was deteriorated, resulting in a very low draw ratio of depth to diameter and a very poor forming process yield.

Comparative Example 11 contained a large proportion of the stretched PPS fibers in the wet-laid PPS fiber nonwoven fabric. Post-papermaking drying and subsequent calendering were performed at a high temperature. Consequently, crystallization proceeded. In addition, due to poor followability of the spray adhesive, the draw ratio of depth to diameter was very low and the forming process yield was very poor.

The laminated body is excellent in thermoformability, and thus can be used as various types of manufactured goods in various fields. For example, the laminated body can be used as a formed product with electrical insulation properties, an electric insulation sheet, or a formed product used to accept a thermal load. In addition to products for electric insulation and various types of formed products, the laminated body can also be used for heat-resistant applications such as a heat-resistant tape and a heat-resistant container.

Also in these cases, the laminated body exhibits a good three-dimensional formability and results in low variability in the shapes of the products in a forming process and an excellent forming process yield.

INDUSTRIAL APPLICABILITY

The laminated body can be used for electric insulation, thermal forming, and heat resistance.

The invention claimed is:
1. A laminated body consisting of:
a thermoplastic resin film comprising polyphenylene sulfide fibers and having a heat of crystallization of 10 J/g or more as measured with a differential scanning calorimeter; and
a wet-laid nonwoven layer comprising polyphenylene sulfide fibers and having a heat of crystallization of 10 J/g or more as measured with a differential scanning calorimeter;

wherein the wet-laid nonwoven layer is stacked on at least one surface of the thermoplastic resin film without an adhesive therebetween, and a heat of crystallization Q1 of the thermoplastic resin film as measured with a differential scanning calorimeter and a heat of crystallization Q2 of the wet-laid nonwoven layer as measured with a differential scanning calorimeter satisfy; $0.5<Q1/Q2<2.0$, and the laminated body is thermoformable and capable of being deep drawn at a draw ratio of depth to a diameter of 0.7 or more, or a ratio of the number of inspected and passed products to the total number of formed products of deep drawing at a draw ratio of depth to a diameter of 0.5 is 95% to 100%.

2. The laminated body according to claim 1, wherein the polyphenylene sulfide fibers constituting the wet-laid nonwoven layer comprise 80 to 100% by mass of unstretched polyphenylene sulfide fibers and 20 to 0% by mass of stretched polyphenylene sulfide fibers.

3. The laminated body according to claim 1, wherein the heat of crystallization Q1 and the heat of crystallization Q2 satisfy: $0.8<Q1/Q2<1.3$.

4. The laminated body according to claim 2, wherein the heat of crystallization Q1 and the heat of crystallization Q2 satisfy: $0.8<Q1/Q2<1.3$.

5. The laminated body according to claim 1, wherein the heat of crystallization Q1 and the heat of crystallization Q2 satisfy: $0.96<Q1/Q2<1.21$.

6. The laminated body according to claim 2, wherein the heat of crystallization Q1 and the heat of crystallization Q2 satisfy: $0.96<Q1/Q2<1.21$.

* * * * *